Figure 4:
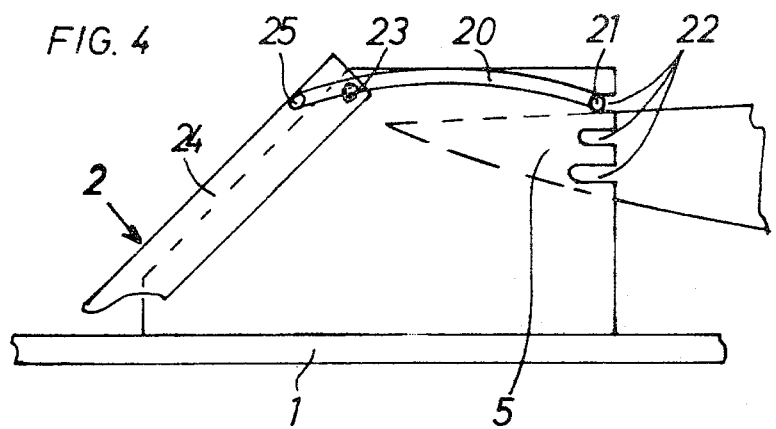

United States Patent [19]

Schumacher, II et al.

[11] 4,295,328
[45] Oct. 20, 1981

[54] HOLDING MEANS FOR GRAIN LIFTERS, SUPPORT SKIDS AND THE LIKE

[76] Inventors: Gustav Schumacher, II, Gartenstrasse 8; Günter Schumacher, Raiffeisenstrasse 10, both of 5231 Eichelhardt, Fed. Rep. of Germany

[21] Appl. No.: 63,478

[22] Filed: Aug. 3, 1979

[30] Foreign Application Priority Data

Aug. 12, 1978 [DE] Fed. Rep. of Germany ....... 2835505
Jul. 17, 1979 [DE] Fed. Rep. of Germany ....... 2928871

[51] Int. Cl.³ ............................................. A01D 55/10
[52] U.S. Cl. ............................................. 56/313
[58] Field of Search ................ 56/312, 313, 314, 318, 56/319, 320

[56] References Cited

U.S. PATENT DOCUMENTS

| 1,862,775 | 6/1932 | Thoen .............................. 56/313 |
| 3,579,967 | 5/1971 | Schumacher ..................... 56/313 |
| 3,834,139 | 9/1974 | Schumacher et al. ............ 56/313 |
| 3,965,659 | 6/1976 | Schumacher et al. ............ 56/313 |

Primary Examiner—Robert A. Hafer
Attorney, Agent, or Firm—Steinberg & Raskin

[57] ABSTRACT

Holding means for grain lifters, support skids or the like for fastening the latter to the cutter mechanism of a harvesting machine, comprising a device provided at one end of the flat support leg to be secured to the mower cutter bar and a retention bracket provided in spaced relationship from the one end on the support leg and embracing, if necessary under bias, the cutter finger, wherein said retention bracket includes two legs provided on each side of said cutter finger, and a locking device connecting said two legs and overlapping said cutter finger.

19 Claims, 11 Drawing Figures

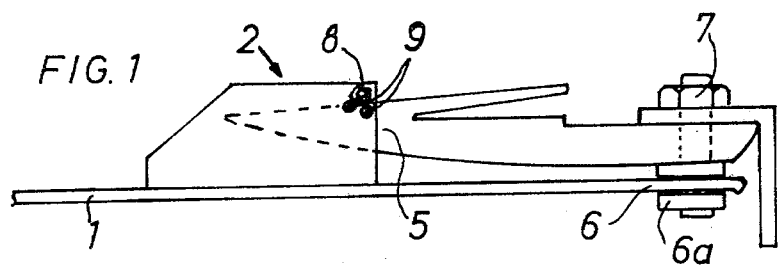
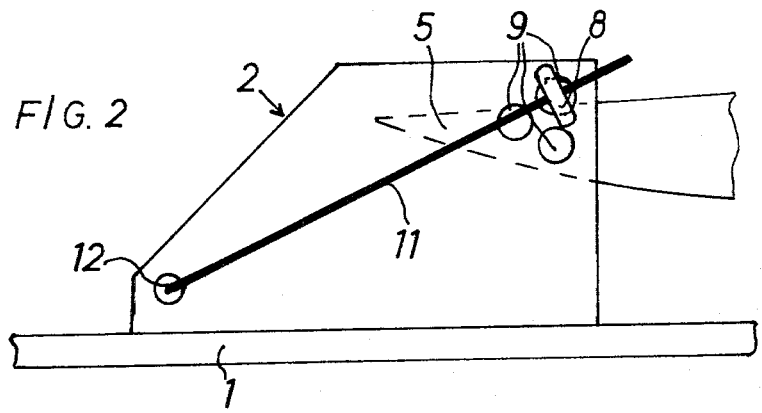
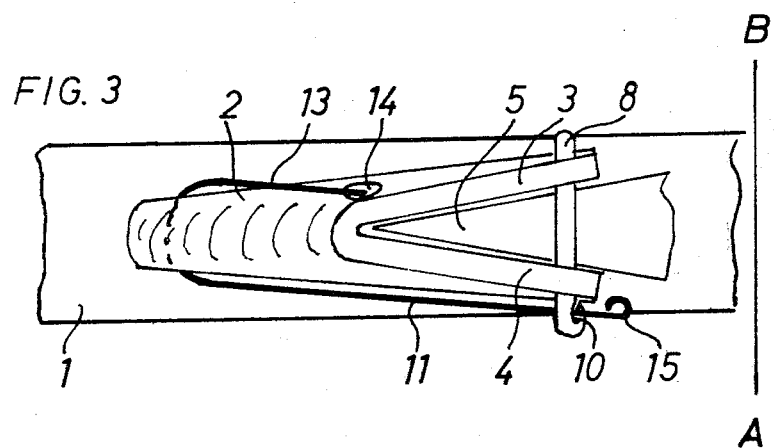

HOLDING MEANS FOR GRAIN LIFTERS, SUPPORT SKIDS AND THE LIKE

The invention relates to a holding means for grain lifters, support skids or the like for fastening the latter to the cutter mechanism of a harvesting machine, preferably a harvester thresher, comprising a device provided at one end of the flat support leg to be secured to the mower cutter bar and a retention bracket provided in spaced relationship from the end on the support leg and embracing, if necessary under bias, the cutter finger.

Numerous varieties of grain lifters are known which are secured to the cutter finger, or as an addition to the cutter finger, respectively, to the cutter mechanism of a harvester. In most of the cases, grain lifters are provided which may be secured, or removed, only by using a tool. In some embodiments, the support leg to the rear end of which fastening is made is arranged above the cutter finger. It is a common disadvantage of such grain lifter structures that if they become loose from the finger in the course of the rough operation, they will immediately get into the machine and cause relatively great damage.

In another embodiment of the grain lifters, the support leg is arranged and secured below the cutter finger of the cutter mechanism.

In the latter kind of grain lifters only those kinds of fixation are of interest in the present case that may get along without the use of tools.

In GDR Patent Specification No. 69,720, a grain lifter is described the spring hard support leg of which is secured below the cutter finger. On the support leg, receiver means for the cutter finger tip is provided that takes over the front guidance of the support leg. The rear end of the support leg slotted in longitudinal direction includes within the slot a cutout which is bent around a receiver means on the cutter finger fastening bolt and is clamped with the aid of a slide. In a further embodiment of the cited GDR patent specification, the support leg is secured with the aid of a flat spring provided on it to the cutter finger fastening screw.

Leaving aside that tightening or arresting, respectively, is hardly possible without using a tool, the movable fastening parts are provided at a location of the cutter mechanism where damages are very frequent and it is therefore not possible to maintain the fastening parts continuously operable.

The same is the case in the fastening method for grain lifters known from U.S. Pat. No. 2,278,814. Leaving aside that the grain lifter, and particularly the support leg is not made of spring steel, the fastening parts are provided in this prior art embodiment at a location accessible only with great difficulties and thus very much endangered in operation.

A further fastening method for grain lifters has been described by U.S. Pat. No. 2,394,838 wherein, in a structural unity together with the cutter finger, a receiver means has been provided at its lower side into which the support leg square in cross section is inserted from the front and is latched in. The disadvantages are the same as arise in connection with the above described structures for fastening the grain lifters.

In Applicants' German Patent Specification No. 1,482,880 and in the corresponding Patents-of-Addition No. 1,507,366; 1,507,367; 1,782,561; 1,507,369; and 1,782,562, a grain lifter lock is described wherein the rear end of the support leg of spring hard flat material is inserted into a receiver means shaped together with, and screwed to, the cutter finger fastening bolt, and a hook open on one side and secured at a distance from the rear end of the support leg which corresponds to the length of the cutter finger, is hooked over the cutter finger. This causes a bias of the spring hard support leg to become effective as the holding force which develops between the rear receiving means of the support leg, where the latter jams tightly when bent upwardly, and the hook open on the side.

In the course of the cutting operation, the cutter finger tip, caused by any unevenness of the soil, moves contrary to the holding force of the biased support leg within the hook which embraces the cutter finger tip in vertical direction. This vertical possibility of motion is very desirable because it favors the springy upward movement of the support leg when passing over rough ground. On the other hand, there is the danger that in case of the upward state and of an additional lateral load, caused for instance by tilting the machine when the cutter mechanism lies on the ground, the hook is moved above the cutter finger tip and is uncoupled. In order to avoid this, several locking devices have been provided which limit the vertical movement of the cutter finger tip within the hook which is open on the side.

Such a limitation however is not desired on the other hand as the elastic properties of the grain lifter are impaired. It might also happen that in case of stronger grain lifter structures, particularly in case of skid grain lifters which, in addition to lifting the grain from the ground have to support the cutter mechanism relative to the ground, the lateral forces become so strong that the grain lifter, the skid and/or the skid grain lifter are torn from the cutter finger tip, as the grain lifter cannot move upwardly because of the lock and is thus more heavily loaded, on one hand, and the lock cannot be made so stable in view of the limited space that it could resist lateral forces, on the other. Particularly in case of modern heavy harvester threshers, the cutter mechanisms of which are substantially broader than the wheel track, these lateral loads are experienced on the outer sides of the broad cutter mechanisms.

In these aforementioned holding means for grain lifters, skids and the like, it is moreover not possible to fix the grain lifter, with the aid of the fastening element embracing the cutter finger, in various heights in order to vary the angle of attack of the grain lifter relative to the cutter mechanism and to adapt it to the corresponding conditions.

In Applicants' German Patent Specification No. 1,939,650, vertical adjustability of the grain lifter fixation has been described which is effected by a vertical adjustment of the rear receiver means for the slotted end of the support leg at the cutter finger screw or by a plurality of receiving grooves vertically arranged one above the other in the cutter finger fastening screw. It is a disadvantage of this prior art vertical adjustment that the receiver elements provided below the cutter finger for the end of the support leg possess a relatively great total height which causes much disturbance if the cutting is to be performed shortly above the ground. These receiver elements extend in vertical direction downwardly and dig themselves into the ground when cutting so short above the ground. The receiver slits become filled with soil and have to be cleaned in a wearisome process before the grain lifter may be changed, i.e. be secured to the cutter finger at a different angle of attack. The receiver elements for the support end become moreover often damaged particularly if the mower cutter bar runs against rocks and other obstacles in the field.

It is now the aim of the present invention to provide a holding means for grain lifters, support skids or the like which does not include the disadvantages shown, which is simple and inexpensive to produce, and with the aid of which a completely safe fixation of the grain lifter is possible and, if necessary, a change of the angle of attack of the grain lifter relative to the cutter mechanism may be performed while the above shown difficulties in connection with the vertically downwardly extending receiver elements for the support leg end do not appear.

This aim is solved with the aid of a holding means for grain lifters, support skids or the like of the kind described above which is characterized in that the retention bracket includes two legs provided on each side of the cutter finger and a locking device connecting the two legs and overlapping the cutter finger is provided.

In accordance with a preferred embodiment of the present invention, the retention bracket may integrally be shaped with the support leg, i.e. the support leg may be provided with laterally upwardly projecting legs embracing the front end of the cutter finger and arresting with the aid of the locking means provided thereon the support leg to the cutter finger.

In accordance with a further advantageous embodiment of the present invention, the retention bracket comprises a U-shaped member secured on the support leg which includes a leg on each side of the cutter finger. Such an embodiment shows itself to be very advantageous with a view to production, as such a retention bracket may very easily be riveted, screwed, or welded to the support leg.

The rear end of the support leg is inserted in the common way into a receiver means provided in the cutter finger fastening screw or on the cutter mechanism so that the support leg, when bent upwardly, is clamped in the rear receiver so that the support leg under bias embraces, with the two legs of the retention bracket, the cutter finger tip and is arrested in this position by the locking device under bias to the cutter finger.

In accordance with an advantageous embodiment of the present invention, the locking device provided on the two legs of the retention bracket comprises at least one opening each in alignment with the two legs to receive a strain bolt, a screw or the like. Such a locking device is characterized in an extreme stability so that the difficulties mentioned in the beginning of the disengagement of the holding means will not be experienced even under extreme operation conditions.

In accordance with a further advantageous embodiment of the present invention, the two legs of the retention bracket include two openings each differently spaced from the support leg to receive the strain bolt or the like.

Such embodiment of the invention makes possible that the grain lifter, the support skid or the like may be secured to the cutter mechanism at two or more angles of attack while the receiver means hitherto provided for this purpose under the cutter finger will not disturb the cutting operation nor will it be damages by the cutting operation.

The openings differently spaced from the support leg for receiving the strain bolt make possible that the latter may be provided at a different distance from the support leg, which permits that the support leg resting with the strain bolt under bias on the cutter finger may be fastened under different angles of attack to the cutter mechanism depending on the opening pair in which the strain bolt is provided.

The strain bolt itself may in various ways be fixed in the openings of the legs of the retention bracket. For this purpose, a nut, a pin or similar means may be applied.

Thus the locking means retains the support leg contrary to the force of the own bias on the cutter finger. In the U-shaped fastening portion, the cutter finger tip may on the other hand also move downward in vertical direction, if the support leg is lifted by unevennesses of the ground which has a favorable effect on the spring properties of the grain lifter. The legs resting on the sides of the cutter finger tip take over the lateral guidance of the support leg and may thus be kept stable so that also stronger lateral forces, which are experienced when tilting the cutter mechanism, are absorbed and the grain lifter, the support skid or the support-skid grain lifter is not torn away from the cutter finger.

The further development of the locking device may, as has already been mentioned, be effected in most different ways the base always being the U-shaped retention bracket which, corresponding to the length of the cutter finger, is secured at a certain distance from the rear end of the support leg, and the two legs whereof touch the cutter finger tip in order to so take over the lateral guidance of the support leg.

The locking member itself need not be very stable as it has to retain only the vertically effective force of the support leg under bias. An additional load is experienced only if the tip of the grain lifter digs into the soil and thus draws the support leg downwardly. In such a case, however, it is indeed desired that the lock should break as then only a new lock has to built in, the support leg itself however will remain undamaged while in case of a more stable lock either the support leg will break or the cutter finger is torn away.

As has already been mentioned, the simplest embodiment of this locking device includes a pin, a bolt or a screw which are inserted through the bores in alignment in the legs of the retention bracket at right angles relative to the longitudinal direction of the cutter finger above its tip and are secured by prior art means such as a nut, pin, detent spring or a tilt pin. This simple embodiment of the locking device has however the disadvantage that it constitutes a separate part which is relatively small and therefore gets often lost in the course of the mounting and dismounting in the field.

In accordance with a particularly advantageous embodiment of the present invention, the strain bolt is therefore kept in its locking position by means of a spring, and it may thus be released by a corresponding counterforce, and in this way the grain lifter may be dismounted.

In accordance with a preferred embodiment of the present invention, the locking member comprises a bolt to be inserted into the openings of the retention bracket and is secured with one of its ends to a spring-loaded flat spring resting on the leg. This flat spring may, for instance, with the other free end be secured to the leg of the retention bracket and thus keeps the strain bolt in this position safely in its position. In such an embodiment, the additional openings for receiving the strain bolt are suitably arranged on the periphery so that only by releasing the strain bolt against the spring force and by turning the flat spring the strain bolt may be inserted into another hole position by which its distance to the support leg is changed and thus the angle of attack of the support leg, and thus of the grain lifter on the cutter mechanism, is changed.

In accordance with another advantageous embodiment of the present invention, there are provided in the legs of the retention bracket slit-shaped openings accessible from the edge and differently spaced from the support leg into which the spring-loaded locking member may be latched in.

In another advantageous embodiment of the present invention, the openings provided on the legs of the retention bracket and differently spaced from the support leg are connected by slots with one another where the locking member may, under the bias of a spring, latch into the corresponding opening. In the two latter embodiments, the strain bolt is suitably provided at its ends with a projecting edge each which avoids lateral movement and thus unwanted release of the strain bolt.

In another preferred embodiment of the present invention, the strain bolt is provided on one of its ends with a ring, or a bore, respectively, through which a retaining spring is provided which is either secured with its free end to the leg of the retention bracket or is guided through corresponding openings in the two legs of the retention bracket and is secured on the opposing left side in a further bore.

If the strain bolt is arranged in the suitable opening pair of the legs of the retention bracket, it is retained by the spring in this position so that no additional safety means against lateral slipping out is necessary. When mounting, or dismounting, respectively, the locking means, the strain bolt is removed from the side contrary to the spring force and the cutting finger tip may be inserted into, or removed from, respectively, the legs. Under the spring force, the strain bolt will automatically latch in and lock the grain lifter to the cutter finger. The force of the spring is suitably so calculated that the strain bolt may be removed without using a tool.

In accordance with another advantageous embodiment, the strain bolt is provided in an oblong hole in the two legs of the retention bracket and may be moved therein. Under the effect of a spring, the strain bolt is maintained in the blocking position. On the other side, the strain bolt may contrary to the spring force easily be moved out of the locking position so that the cutter finger tip becomes free and the grain lifter may be removed.

In accordance with another advantageous embodiment of the present invention, the locking device provided on the retention bracket is shaped like so-called box lock. The strain bolt is inserted into the suitable opening pair in the two legs on the retention bracket and is biased with the aid of a clamping coverplate supported in the two legs of the U-shaped portion over a dead center and is thus kept in the closed state.

As has already been mentioned, the opening pairs may be accessible from the lateral edge of the two legs or via slots connected therewith. In practical operation it has shown that parts of straw and of soil are flung, by the reciprocating cutter from behind under the cutter finger tip and thus into the space defined by the legs of the U-shaped bracket and the finger tip, and are there pressed together by the cutter finger tip which moves in vertical direction. This may result in that the cutter finger can ultimately no longer move in vertical direction and thus the springy properties of the grain lifter are impaired.

These difficulties are avoided in accordance with a further advantageous embodiment of the invention in that cutouts are provided in the two legs of the retention bracket.

By these cutouts provided in the legs, preferably trapezoidally enlarging downwardly towards the support leg, all of the straw and soil particles collected under the cutter finger tip may easily be ejected or automatically be spattered out. If for instance soil particles have assembled under the cutter finger tip and the grain lifter moves upward, the cutter finger tip moving downwardly in vertical direction presses these straw and soil particles out through the lateral openings. The light-weight straw particles cannot get struck as they are caught by passing stalks and stubbles and are thus pressed out from the space under the cutter finger tip.

The stability of the retention bracket is not influenced by the provisions of cutouts in the legs of the retention bracket.

A further simplification in the production of the holding means according to the invention as described above in detail is obtained in accordance with the invention in that the strain bolt is made as one piece from a spring steel clamp embracing one end of the retention bracket and latching with the free end thereof into a lateral opening of the leg.

Such a wire bended part made of spring steel wire combines the strain bolt as well as the arresting device for the strain bolt. Contrary to the sole strain bolt, this bent part is relatively large and will consequently not so easily get lost and may relatively easily be produced by a bending process.

The strain bolt penetrating through the two openings in the leg is suitably angularly bent, and the remaining portion of the bent wire part forms an elastic clamp including an oblong ring thus embracing one end of the retention bracket so that the free end of the clamp which is suitably also bent latches into a lateral opening of one leg.

It has shown to be particularly advantageous if the clamp embraces, with the ring thereof, the front end of the retention bracket and the free end latches into a lateral opening of one leg. To this end, either an additional opening may be provided in the leg or the free end, which is suitably bent round, may also latch into the cutout of one leg.

In this way, the clamp is absolutely safe and retains the strain bolt safely in the openings of the two legs so that the grain lifter or the support skid is safely secured to the cutter finger.

A still safer fixation of the strain bolt in the openings of the leg is obtained in accordance with a further advantageous embodiment of the present invention in that the strain bolt may be rotated within the openings of the legs and is provided with at least one projection or cam engaging, in the locked position, behind an opening of the legs.

In such an embodiment, at least one opening provided in the legs is provided with an additional lateral cutout through which the cam or projection suitably provided and the end of the strain bolt may be inserted. Rotating the strain bolt and the clamp connected therewith around an angle of for instance 45°, 90°, or, which is particularly preferred, for 180° and arresting the clamp by latching the free end thereof into the additional opening or into the cutout of one of the legs leads to an absolutely safe fixation of the strain bolt as in this rotational position the cam engages behind the opening and, if in this position, cannot be removed. Releasing the strain bolt is possible only in that the free end of the clamp is removed from the opening or the cutout and the clamp is returned into the particular introduction position so that the cam or the projection at the end of the strain bolt is in alignment with the additional cutout in the opening of the leg and thus can be drawn out.

The provision of such a cam or projection on the strain bolt may be effected, as has already been described, at the end thereof and/or at a location where the strain bolt has just penetrated through the opening of the first leg. It is selfevident that in this case also the opening of the first, and if necessary also the opening of the second leg, should be provided with such an additional cutout through which the cam, or cams, respectively, provided on the strain bolt may penetrate.

In accordance with a further advantageous embodiment, the holding means according to the invention is characterized in that the axes of the openings in the two legs are arranged at an angle other than 180° relative to each other and the strain bolt has such a curvature that is may be inserted, when the position of the angle differs from the locking position, into the openings of the legs and may be arrested by turning.

Turning of the bolt and of the clamp made as one piece together with it may also be effected for any angular degrees, preferably for 45° to 90° or particularly preferably for 180°. The bolt will tightly clamp in in the two bores in the legs and cannot be released unless it is returned from the locking position into the introduction position.

Common to all the above described embodiments of the present invention is the U-shaped retention bracket for the lateral guidance of the support leg and the locking device to be operated without any additional tools which is above the cutter finger tip and contrary to the spring force of the biased support leg presses upon the cutter finger tip and thus holds the support leg. The cutter finger tip may move between the strain bolt and the support leg in vertical direction which favors the upward movement of the support leg. In the bent-up state of the support leg, the strain bolt may be released, removed and so shifted that the strain bolt becomes ineffective and the grain lifter, the support skid or the support-skid grain lifter may be removed.

Figure 5:
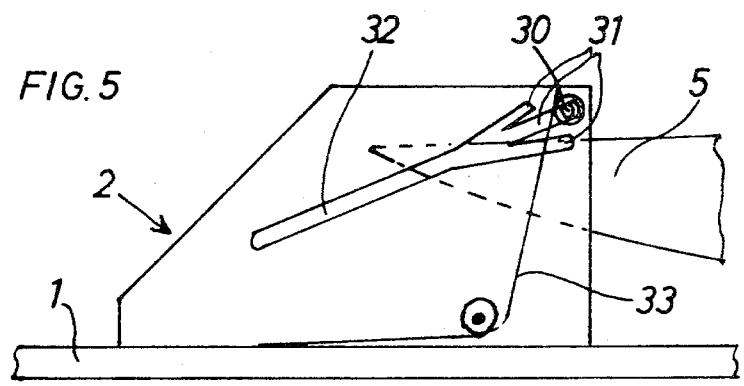
Figure 6:
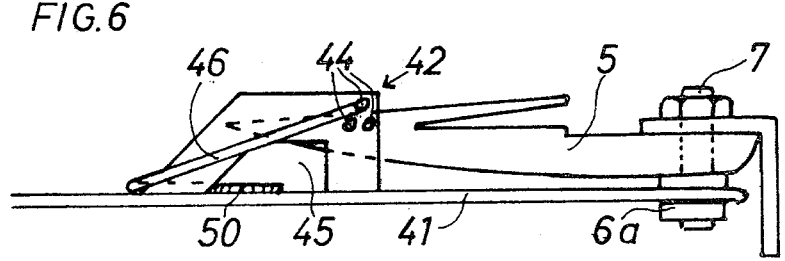
Figure 7:
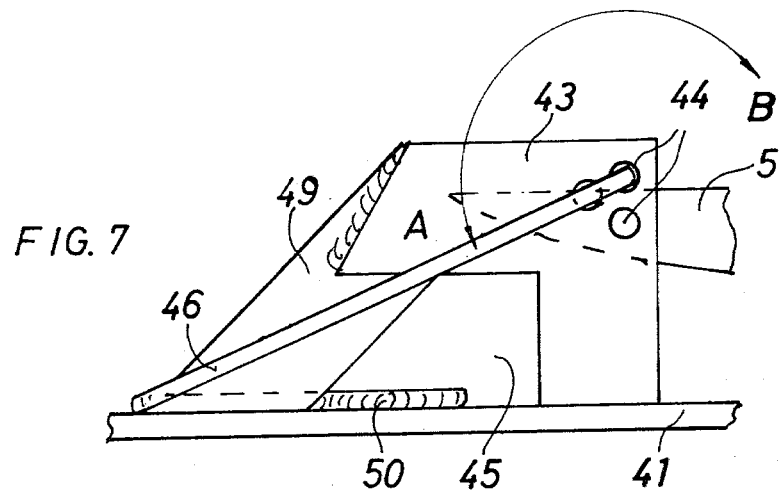
Figure 8:
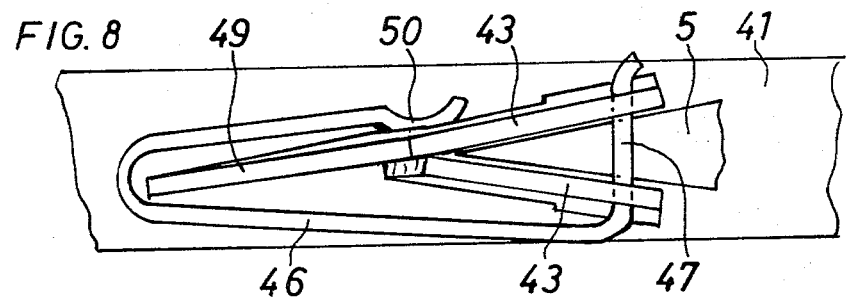
Figure 9:
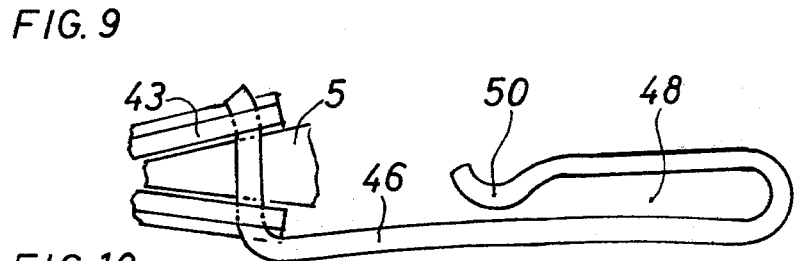
Figure 10:
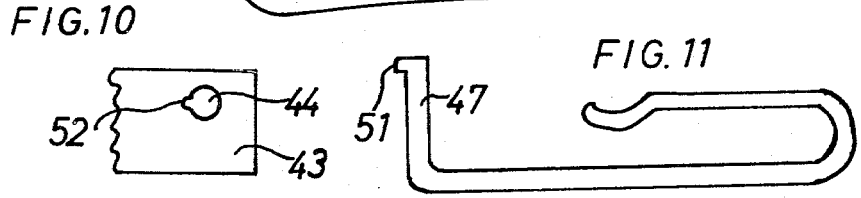
Figure 11:
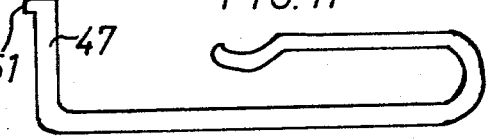

The invention will now be explained in more detail based on the exemplified embodiments as shown in the drawings wherein FIG. 1 is a lateral view of a holding means for the grain lifter according to the present invention, FIG. 2 is a lateral view of a preferred embodiment of the holding means, FIG. 3 is a top view of the embodiment of the holding means as shown in FIG. 2, FIG. 4 is a lateral view of another embodiment of the holding means of the invention, FIG. 5 is a lateral view of a further embodiment of the holding means of the invention, FIG. 6 is a lateral view of another embodiment of the holding means of the invention for fastening grain lifters, support skids or the like to the cutter mechanism of a harvester, FIG. 7 is an enlarged representation of a lateral view of the finger bag with the strain bolt in locking position and the retaining clamp integral therewith, FIG. 8 is a top view on the holding means according to FIG. 2, FIG. 9 is a top view on the holding means according to FIG. 2, wherein the strain bolt with the retaining clamp is turned for 180°, FIG. 10 is a lateral view of the opening in the leg of the retention clamp provided with an additional cutout, FIG. 11 is a lateral view of strain bolt integral with the retention clamp together with the additionally-provided cam or projection for securing it in the opening of the leg.

V-shaped retention clamp 2 is solidly secured to support leg 1 of spring hard flat material so that the two legs 3 and 4 (FIG. 3) together with support leg 1 form a U-shaped receiver means for cutter finger tip 5.

Support leg 1 is inserted with its rear end 6 into a prior art clamping device 6a formed with the cutter finger fastening bolt 7 and screwed therewith.

Strain bolt 8 is guided above cutter finger tip 5 through one of opening pairs 9 provided in the retention clamp and so secures support leg 1 to the cutter finger. When support leg 1 moves upward, cutter finger tip 5 flanked by the two legs 3 and 4 between strain bolt 8 and support leg 1 permits vertical movements of the retention clamp. Depending on the selection of the opening pair, into which the retention bolt is inserted, the support leg receives a different height adjustment relative to the cutter finger. For dismounting, strain bolt 8 is removed on the side, the support leg is tilted downward and is withdrawn from the rear clamping device 6a.

For mounting, support leg rear end 6 is again inserted into clamping device 6a, bent upward, whereby it is brought under a certain bias, is guided with the retention bracket around the finger tip, and the strain bolt is inserted above the cutter finger tip through openings 9 of legs 3 and 4. In a preferred embodiment, in order to provide additional safety elements for preventing the strain bolt from gliding to the side, and so as to connect the strain bolt to in a manner such retention bracket 2 that it will not get lost even in the removed state, the strain bolt is provided with a ring 10 through which leg spring 11 is guided. The latter is guided through an opening 12 in retention bracket 2, is bent to shape a U and is fixed with the leg 13 thereof in a further opening 14. In view of the support of leg end 13 of spring 11 against leg 3 of retention clamp 2, the spring is under a bias and tries to press strain bolt 8 into direction B. To prevent, in the dismounted state, the locking device 8 removed from the openings from gliding from spring 11 and from getting lost, spring 11 is bent on one of its ends 15.

The force of spring 11 is so calculated that strain bolt 8 may be moved without using tools against the spring force in direction A. When releasing the spring, bolt 8 is pressed again by the spring into its locking position.

In a further embodiment according to FIG. 4, the locking member is similar to the prior art box lock. In this example, locking member 20 is guided with the locking range 21 thereof from the side into one of cutouts 22. At 23, clamping coverplate 24 is pivotally supported to retention clamp 2, and to the latter, locking member 20 is also pivotally supported to cover plate 24 at 25.

The figure shows the clamping coverplate in the closed state. If the latter is rotated in a clockwise direction for 180° around its point of rotation 23, locking range 21 moves out of the rear cutout 22, may thereby be turned upward in a counterclockwise direction and retention bracket 2 including support leg 1 may downwardly be removed from the cutter finger tip. Also in this embodiment of the front receiver means of the support leg it is possible to insert locking range 21 of locking member 20 into different receiver cutouts 22 in order to obtain different adjustments of the support leg relative to the cutter finger tip 5.

In a further embodiment according to FIG. 5, a strain bolt 30 may be inserted into different receiver slots 31 all of which are directed toward an unlocking slot 32. By leg spring 33, strain bolt 30 is kept in one of the receiver slots 31.

For dismounting, support leg 1 is lifted a little, the strain bolt is drawn contrary to the force of the leg spring 33 into the unlocking slot 32 and support leg 1 is tilted with the retention bracket downward from cutter finger tip 5. Mounting is effected in the reverse order.

By correspondingly selecting one of receiver slots 31, it is also possible in this case to adjust support leg 1 in different height positions relative to the cutter finger 5.

In the embodiment shown in FIGS. 6 through 9, retention bracket 42 on support leg 41 of a grain lifter, a support skid or the like, which constitutes the finger bag, is solidly secured, by suitable means such as welding, riveting or the like, to the two legs 43. The two legs 43 are welded to each other in the front region and so form an acute-angled finger bag 42. It is of course also possible to shape fingerbag 42 as a single piece as a bending part or to provide it directly on support leg 41.

In the legs 43, there are provided one or a plurality of pairs of openings 44 each. One pair of openings forms the receiver means for the strain bolt. Although the corresponding opening pair is facing each other, the openings in the shown example are not in alignment because of the acute-angular relation of legs 43. Legs 43 are furtheron provided with cutouts 45. In the embodiment, these cutouts are trapezoidal, but other shapes may be selected as well. Through these cutouts, solid straw particles and other foreign substances are pressed out by cutter finger tip 5 when cutter finger tip 5 is moved in vertical direction in fingerbag 42.

Locking bracket 45 of spring steel including a strain bolt 47 angularly secured thereto serves as the locking member. The bracket itself serves as the safety mechanism. The oblong hook 48 of the clamp is guided around the front edge of holding portion 49 and the correspondingly shaped free end 50 of the locking bracket latches into cutout 45 of one of legs 43.

When assembling, the grain lifter, the support skid or the like is inserted with one of the ends into a corresponding receiver means 6a of finger fastening screw 7 on the mower cutter bar and bent up that much that finger tip 5 gets between legs 43 of finger bag 42. The locking bracket tilted around 180° (hook 48 in position B) is then inserted with angle-shaped strain bolt 47 through opening pair 44 in the two legs 43 above cutter finger tip 5. This situation is shown in FIG. 9. Locking clamp 46 is then tilted in direction A as seen in FIG. 7. Stain bolt 47 is thereby wedged in in view of its bent shape in the non-aligned openings 44. At the same time, the free end 50 of the locking bracket moves along the outer side of one of legs 43 downwardly whereby hook 48 contrary to the spring force of the bracket is bent outward, and finally end 50 latches into cutout 45.

By giving it a corresponding shape, the spring force of the bracket is so calculated that for dismounting, the free end of the bracket may be taken out of cutout 45 without using a tool and bracket 46 may be tilted for about 180°, and then strain bolt 47 may be removed from opening pair 44 in legs 43. The shape of the free end 50 of the retention bracket permits a corresponding latching in of strain bolt 47 also when other openings 44 in legs 43 are used.

In a strain bolt 47 shown in FIG. 11, a cam or projection 51 is provided on the free end thereof which is inserted in the course of the assembly into opening 44 of leg 43, opening 44 including an additional cutout 52 as shown in FIG. 10, and by turning strain bolt 47 and the holding bracket, engages behind opening 44 and thus safely secures the strain bolt.

As is understood, the holding means of the invention may not only be used in the aforesaid grain lifters, support skids and the like which are inserted with the slit provided at the free end into a corresponding receiver means 6a of finger fastening screw 7 but is may also be employed in such grain lifters, support skids and the like which are directly secured to the cutter finger screw or are otherwise secured to the mower cutter bar. In this case, the two legs of the retention bracket may be connected with one another via the cutter finger and the corresponding opening pairs in the legs of the retention bracket may serve only to adjust the height of the support leg depending on into which opening pair a strain bolt has been inserted and arrested.

We claim:

1. Holding apparatus for coupling a resilient, substantially flat support leg of a grain lifter, support skid or the like, to a cutter finger of the cutter mechanism of a harvester, comprising:
    clamping means for clamping one end of said support leg with respect to said cutter finger;
    a retention bracket fixed to said support leg at a location spaced from said clamping means, said retention bracket including a pair of upstanding legs, each of which extends from said support leg on a respective side of said cutter finger upwardly beyond the same; and
    locking means located vertically above said cutter finger and extending between said upstanding legs of said retention bracket so that said cutter finger is received in the space defined between said support leg, said locking means and said pair of upstanding legs of said retention bracket;
    whereby said support leg can be resiliently biased in a manner such that said locking means engage said cutter finger and said pair of upstanding legs of said retention bracket prevent the latter from unhooking from said cutter finger during up-and-down movement of said resilient support leg when engaging ground irregularities.

2. Holding apparatus according to claim 1, wherein said retention bracket is integrally connected to said support leg.

3. Holding apparatus according to claim 1, wherein said retention bracket comprises a U-shaped member secured on said support leg.

4. Holding apparatus according to claim 1, wherein said locking means extending between said two legs of said retention bracket comprises at least one opening formed in each of said two legs to define at least one pair of openings which are adapted to receive an elongate member such as a strain bolt, a screw or the like and an elongate member received in said pair of openings.

5. Holding apparatus according to claim 4, wherein in each of said two legs of said retention bracket at least two openings are formed to define at least two pairs of openings which are each differently spaced from said support leg to receive the elongate member.

6. Holding apparatus according to claim 4, wherein said elongate member is secured by fastening means, such as a nut, a pin or corresponding means, to said legs of said retention bracket.

7. Holding apparatus according to claim 4, wherein said elongate member is held in a locking position extending between said upstanding legs of said retention bracket by means of a spring.

8. Holding apparatus according to claim 7, wherein said elongate member comprises a bolt adapted to be inserted into said openings of said retention bracket and secured at one of its ends to a spring-loaded flat spring resting on said leg.

9. Holding apparatus according to claim 7, wherein slit-shaped openings are formed in each of said legs of said retention bracket, said openings being accessible from the edge and differently spaced from said support leg into which said spring-loaded locking member is adapted to be received.

10. Holding apparatus according to claim 4, wherein said openings provided on said legs of said retention bracket and differently spaced from said support leg and are connected by slots with one another and said elongated locking member is receivable under the bias of a spring into the corresponding opening.

11. Holding apparatus according to claim 1, wherein said legs of said U-shaped retention bracket are connected to the side averted from said cutter finger.

12. Holding apparatus according to claim 1, wherein a cutout is formed in each of said two legs of said retention bracket.

13. Holding apparatus according to claim 12, wherein said cutouts are trapezoidal, enlarging downwardly towards said support leg.

14. Holding apparatus according to claim 1, wherein said locking means includes an elongate member, such as a strain bolt or the like, said elongated member constituting a spring steel clamp formed so as to embrace one end of said retention bracket and having a free end adapted to latch into a lateral opening formed in one of said legs.

15. Holding apparatus according the claim 14, wherein said clamp embraces the front end of said retention bracket and the free end latches into lateral opening of said leg.

16. Holding apparatus according to claim 14, wherein a cutout is formed in each of said two legs of said retention bracket and wherein said free end of said clamp latches into said cutout of one of said legs.

17. Holding apparatus according to claim 14, wherein said elongate member is provided with at least one projection or cam engaging in a locked position behind an opening formed in said legs.

18. Holding apparatus according to claim 4, wherein the axes of said openings in said two legs are arranged at an angle other than 180° relative to each other and said elongate member has such a curvature that it may be inserted when the position of the angle differs from the locking position into the openings of said legs and may be arrested by turning.

19. Holding apparatus according to claim 6, wherein said elongate member may be inserted in said two openings of said leg and by turning for about 180° may be arrested.

* * * * *